(12) United States Patent
Tsubaki et al.

(10) Patent No.: US 9,189,893 B2
(45) Date of Patent: Nov. 17, 2015

(54) IMAGE PROCESSING DEVICE, IMAGE PROCESSING METHOD, AND RECORDING MEDIUM

(75) Inventors: Ikuko Tsubaki, Osaka (JP); Hisao Hattori, Osaka (JP); Ken-ichiro Yamamoto, Osaka (JP); Hisao Kumai, Osaka (JP); Mikio Seto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 133 days.

(21) Appl. No.: 14/009,339

(22) PCT Filed: Jan. 6, 2012

(86) PCT No.: PCT/JP2012/050134
§ 371 (c)(1),
(2), (4) Date: Oct. 2, 2013

(87) PCT Pub. No.: WO2012/137520
PCT Pub. Date: Oct. 11, 2012

(65) Prior Publication Data
US 2014/0029838 A1    Jan. 30, 2014

(30) Foreign Application Priority Data
Apr. 6, 2011   (JP) .................. 2011-084142

(51) Int. Cl.
*G06K 9/00*    (2006.01)
*G06T 19/20*    (2011.01)
(Continued)

(52) U.S. Cl.
CPC ............ *G06T 19/20* (2013.01); *H04N 13/0022* (2013.01); *H04N 13/0438* (2013.01); *H04N 13/0497* (2013.01)

(58) Field of Classification Search
USPC .................. 382/154, 115, 117, 128, 171, 282; 340/5.81, 5.82, 5.83
See application file for complete search history.

(56) References Cited

U.S. PATENT DOCUMENTS
7,102,686 B1 * 9/2006 Orimoto ................ G03B 35/08
348/231.7
(Continued)

FOREIGN PATENT DOCUMENTS
JP    09-121370 A    5/1997

OTHER PUBLICATIONS

Official Communication issued in International Patent Application No. PCT/JP2012/050134, mailed on Apr. 3, 2012.
(Continued)

*Primary Examiner* — Yosef Kassa
(74) *Attorney, Agent, or Firm* — Keating & Bennett, LLP

(57) ABSTRACT

To generate an image that enables effective suppression of the occurrence of binocular rivalry and that facilitates stereoscopic vision. A left-eye image feature point extraction unit (13b) and a right-eye image feature point extraction unit (13d) extract feature points from a left-eye image and a right-eye image, respectively. A number-of-non-corresponding-points calculation unit (13g) calculates, in a case where the feature points in one image among the left-eye image and the right-eye image, which are extracted by a left-eye image feature point extraction unit (13b) and a right-eye image feature point extraction unit (13d), are shifted a certain distance in the horizontal direction, the number of feature points in the one image that do not correspond to the feature points in the other image, for each shift distance. A disparity value adjustment unit (13h) adjusts a disparity value between the left-eye image and the right-eye image in accordance with the number calculated for each shift distance.

9 Claims, 6 Drawing Sheets

(51) Int. Cl.
*H04N 13/00* (2006.01)
*H04N 13/04* (2006.01)

(56) References Cited

U.S. PATENT DOCUMENTS

| | | | |
|---|---|---|---|
| 7,599,616 B2 * | 10/2009 | Uchiumi | H04N 13/0454 396/324 |
| 7,819,525 B2 * | 10/2010 | Connell, II | 351/204 |
| 8,116,557 B2 * | 2/2012 | Ha et al. | 382/154 |
| 8,564,667 B2 * | 10/2013 | Yun | G01S 3/7865 348/143 |
| 8,599,107 B2 * | 12/2013 | Mihara | G09G 3/003 345/32 |
| 8,970,675 B2 * | 3/2015 | Morioka et al. | 348/46 |

OTHER PUBLICATIONS

Uchikawa et al., "Shikaku II, Shikakukei no Chuki Kouji Kinou (Vision II, Middle-Vision High-Level Function of Visual System)", Asakura Publishing Co., Ltd., Sep. 2007, pp. 110-111.

\* cited by examiner

FIG. 2
(A)
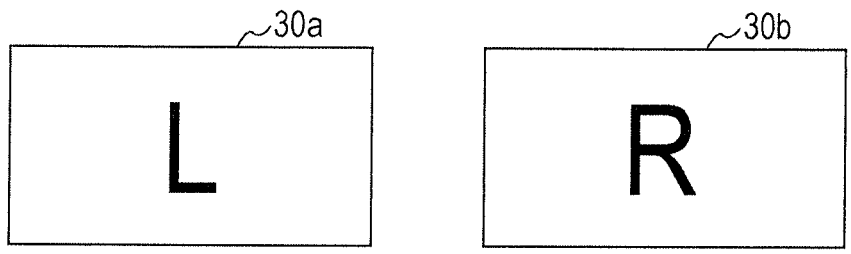
(B)
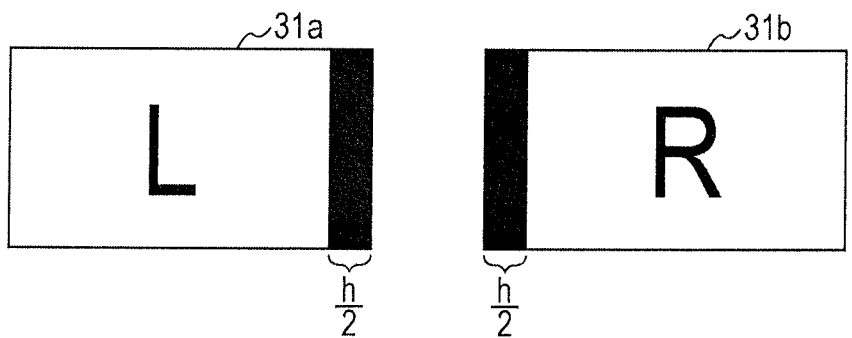
(C)
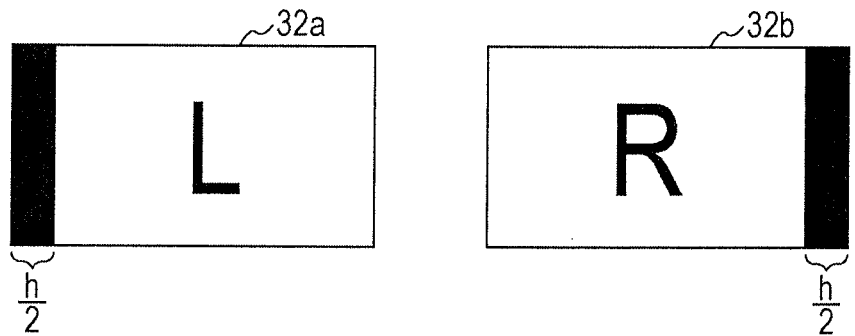

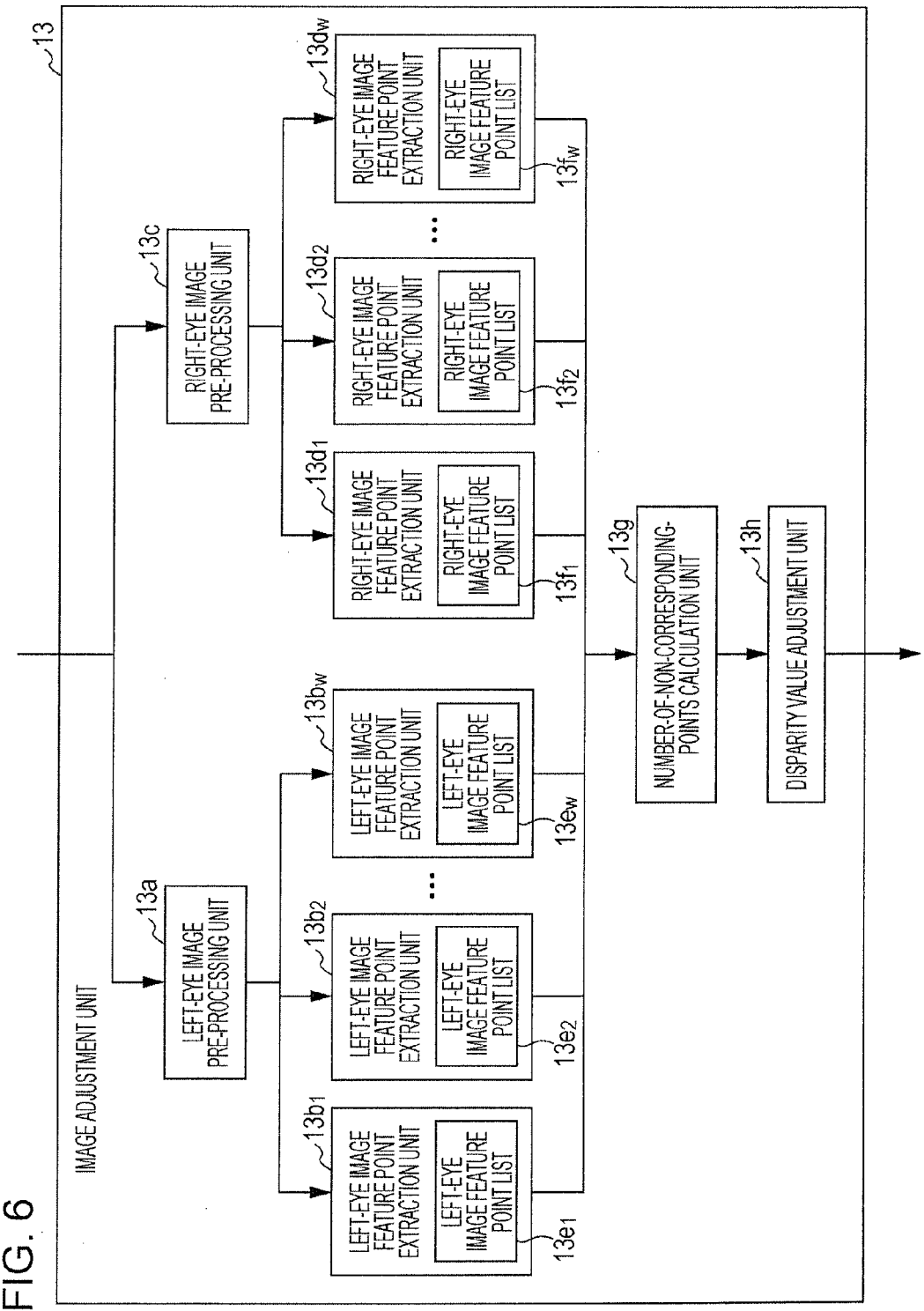

IMAGE PROCESSING DEVICE, IMAGE PROCESSING METHOD, AND RECORDING MEDIUM

TECHNICAL FIELD

The present invention relates to an image processing device, an image processing method, and a computer-readable recording medium having recorded thereon a computer program for causing a computer to execute the image processing method for adjusting a disparity value between a left-eye image and a right-eye image.

BACKGROUND ART

In recent years, stereoscopic image display devices configured to display a left-eye image and a right-eye image on a display to achieve stereoscopic vision have been becoming increasingly widespread. In stereoscopic vision, a positional displacement of corresponding points between the left-eye image and the right-eye image is called disparity. It is known that a marked increase in disparity in the divergence direction or convergence direction makes it difficult to attain stereoscopic vision.

When a person observes a left-eye image and a right-eye image, depth is perceived by means of binocular retinal disparity. Binocular retinal disparity is the difference between images of an external object projected onto the right and left retinas. In order to detect binocular retinal disparity, it is necessary to determine which points on the retinal images of the two eyes are produced by a single object. NPL 1 introduces models of a mechanism for detecting retinal disparity.

In one such model, on the basis of the concept that a luminance edge in the right and left images is a fundamental feature of binocular correspondence, close points having almost the same contrast polarity and orientation are associated with each other. Another model is introduced in which a plurality of spatial filters having different orientation selectivities and sizes are applied to each of the right and left images, vectors formed by the outputs of these spatial filters are used to distinguish local structures at given positions in the image from each other, and the points of highest similarity between vectors at the respective positions on the right and left eyes are associated with each other.

PTL 1 discloses a stereoscopic TV apparatus in which a block in a left image and a block in a right image are associated with each other to adjust the amount of binocular disparity. In the disclosed stereoscopic TV apparatus, a correlation Corr(i, j) between a block in the left image and a block in the right image is calculated using Expression (1) as follows:

[Math. 1]

$$\mathrm{Corr}(i, j) = \sum_{k=1}^{n \times n} |G_L(X_k, Y_k) - G_R(X_k - i, Y_k - j)| \quad (1)$$

where $G_L(X_k, Y_k)$ and $G_R(X_k, Y_k)$ are luminance values at the coordinates $(X_k, Y_k)$ in the left image and the right image, respectively, n is the number of horizontal and vertical pixels in the respective blocks in the left image and the right image (the total number of pixels in the blocks is given by n×n), and i and j are the amounts of translation of a block in the horizontal and vertical directions, respectively.

In the stereoscopic TV apparatus, the amounts of translation i and j between which the correlation Corr(i, j) is minimum are searched for, and accordingly a block in the right image is associated with a block in the left image. Specifically, in the stereoscopic TV apparatus, the block in the right image having the most similar luminance value to a block in the left image is searched for, and these blocks are set as corresponding blocks.

CITATION LIST

Patent Literature

PTL 1: Japanese Unexamined Patent Application Publication No. 9-121370

Non Patent Literature

NPL 1: Edited by Keiji UCHIKAWA and Satoshi SHIOIRI (main), "Shikaku II, Shikakukei no Chuki Kouji Kinou (Vision II, Middle-Vision High-Level Function of Visual System)," Asakura Publishing Co., Ltd., September 2007, pp. 110-111

SUMMARY OF INVENTION

Technical Problem

However, the related art technology described above does not take into account areas that do not correspond to each other between the right and left images, and thus there is a problem in that it is difficult to suppress the occurrence of binocular rivalry. Binocular rivalry is an unstable state where in a case where the right and left images include completely different areas that do not correspond to each other, one of the left image or the right image is perceived in these areas and the perception of the images alternates with time or depending on the position of observation. Binocular rivalry is caused by, for example, differences in shape, brightness, color, and so forth between the images projected onto the retinas of the two eyes. Once binocular rivalry occurs, it is very difficult to attain stereoscopic vision.

In light of the problem described above, it is an object of the present invention to provide an image processing device and an image processing method capable of generating an image that enables effective suppression of the occurrence of binocular rivalry and that facilitates stereoscopic vision, a computer-readable recording medium having recorded thereon a computer program for causing a computer to execute the image processing method.

Solution to Problem

To overcome the problem described above, according to a first technical means of the present invention, there is provided an image processing device for adjusting a disparity value between a left-eye image and a right-eye image, including a feature point extraction unit that extracts feature points from each of the left-eye image and the right-eye image; a number-of-non-corresponding-points calculation unit that calculates, in a case where the feature points in one image among the left-eye image and the right-eye image, which are extracted by the feature point extraction unit, are shifted a certain distance in a horizontal direction, the number of feature points in the one image that do not correspond to the feature points in the other image, for each shift distance; and a disparity value adjustment unit that adjusts a disparity value between the left-eye image and the right-eye image in accordance with the number calculated for each shift distance by the number-of-non-corresponding-points calculation unit.

According to a second technical means of the present invention, in the first technical means, the feature point extraction unit performs filtering on the left-eye image and the right-eye image using a filter having certain response characteristics, and extracts, as a feature point in the left-eye image and a feature point in the right-eye image, pixels having larger pixel values than a certain threshold value in a left-eye image and a right-eye image that are obtained as a result of the filtering.

According to a third technical means of the present invention, in the second technical means, the feature point extraction unit executes filtering by applying a plurality of filters having different response characteristics to each of the left-eye image and the right-eye image, and extracts, as a feature point in the left-eye image and a feature point in the right-eye image, pixels having larger pixel values than a certain threshold value in a left-eye image and a right-eye image that are obtained as a result of respective filtering.

According to a fourth technical means of the present invention, in the second or third technical means, the filter is a bandpass filter.

According to a fifth technical means of the present invention, in any one of the first to fourth technical means, the disparity value adjustment unit adjusts a disparity value between the left-eye image and the right-eye image in accordance with a frequency distribution where a frequency is represented by the number calculated by the number-of-non-corresponding-points calculation unit and a class is represented by a distance between a feature point in the left-eye image and a feature point in the right-eye image.

According to a sixth technical means of the present invention, in any one of the first to fifth technical means, the number-of-non-corresponding-points calculation unit calculates the number of feature points in the one image in such a manner that a feature point having a pixel value that is spaced away from a pixel value of a feature point in the other image by a certain value or more is included in the feature points in the one image that do not correspond to the feature points in the other image.

According to a seventh technical means of the present invention, in any one of the first to sixth technical means, the image processing device further includes a display control unit that controls display processing of the left-eye image and the right-eye image between which a disparity value has been adjusted by the disparity value adjustment unit.

According to an eighth technical means of the present invention, there is provided an image processing method for adjusting a disparity value between a left-eye image and a right-eye image, including a feature point extracting step of extracting feature points from each of the left-eye image and the right-eye image; a number-of-non-corresponding-points calculating step of calculating, in a case where the feature points in one image among the left-eye image and the right-eye image, which are extracted in the feature point extracting step, are shifted a certain distance in a horizontal direction, the number of feature points in the one image that do not correspond to the feature points in the other image, for each shift distance; and a disparity value adjusting step of adjusting a disparity value between the left-eye image and the right-eye image in accordance with the number calculated for each the shift distance in the number-of-non-corresponding-points calculating step.

According to a tenth technical means of the present invention, in the eighth technical means, there is provided a non-transitory computer-readable recording medium having recorded thereon the computer program for causing a computer to execute the image processing method described above.

Advantageous Effects of Invention

According to the present invention, feature points are extracted from each of a left-eye image and a right-eye image. In a case where the extracted feature points in one image among the left-eye image and right-eye image are shifted a certain distance in the horizontal direction, the number of feature points in the one image that do not correspond to the feature points in the other image is calculated for each shift distance. Further, disparity values between the left-eye image and the right-eye image are adjusted in accordance with the numbers calculated for the respective shift distances. Thus, an image that enables effective suppression of the occurrence of binocular rivalry and that facilitates stereoscopic vision can be generated.

BRIEF DESCRIPTION OF DRAWINGS

FIG. 2 includes diagrams explaining a process for display control of a left-eye image and a right-eye image.

FIG. 6 is a diagram illustrating an example of the configuration of an image adjustment unit according to a second embodiment of the present invention.

DESCRIPTION OF EMBODIMENTS

Embodiments of the present invention will be described in detail hereinafter with reference to the drawings.

(First Embodiment)

Figure 1:
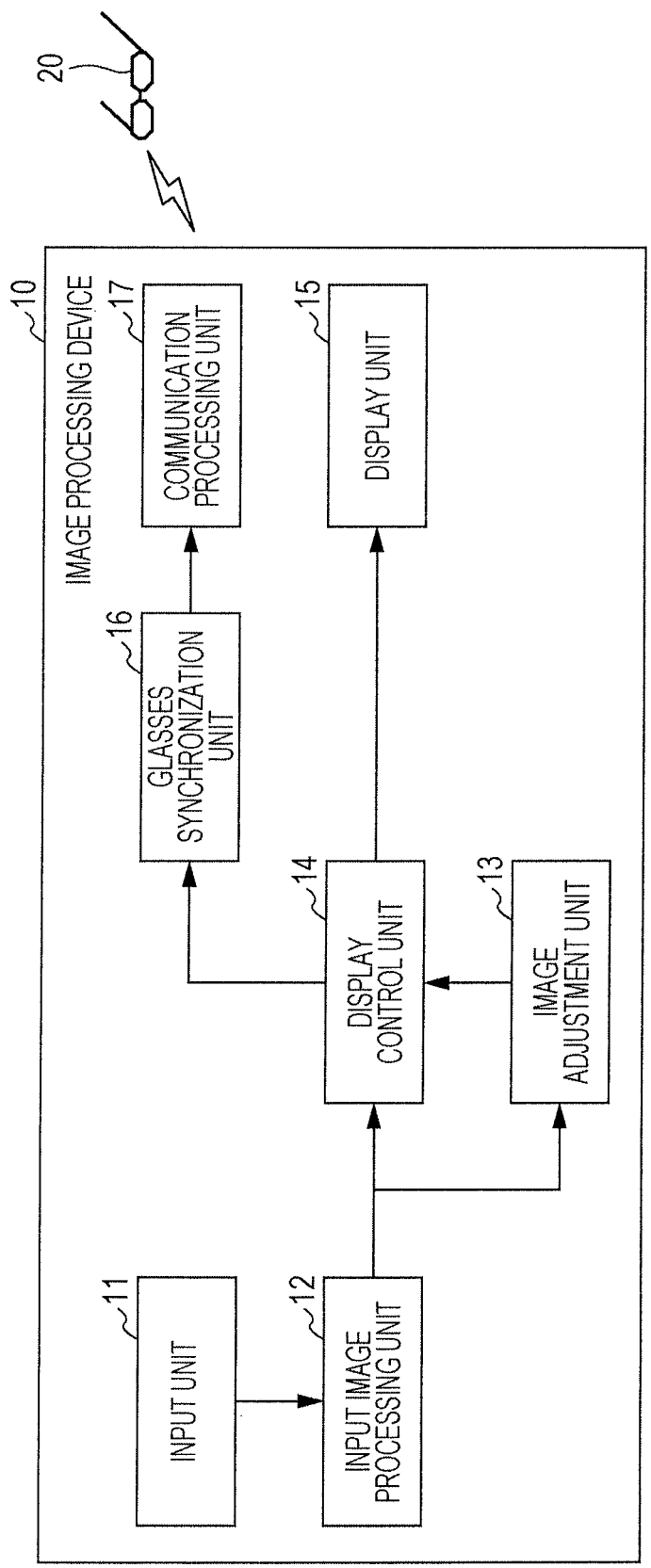
FIG. 1 is a diagram illustrating an example of the configuration of an image processing device according to a first embodiment of the present invention.

A description will be first given of the configuration of an image processing device according to a first embodiment of the present invention. FIG. 1 is a diagram illustrating an example of the configuration of an image processing device 10 according to the first embodiment of the present invention. As illustrated in FIG. 1, the image processing device 10 includes an input unit 11, an input image processing unit 12, an image adjustment unit 13, a display control unit 14, a display unit 15, a glasses synchronization unit 16, and a communication processing unit 17.

The input unit 11 is a processing unit that receives an input image for stereoscopic vision. The input image is input to the image processing device 10 by various ways such as being broadcast from a broadcast station, being electronically read from a recording medium such as a DVD (Digital Versatile Disk) or a Blu-ray Disc, or being transmitted over a network.

Further, the input image includes a left-eye image and a right-eye image that are used for stereoscopic vision. The input image may include image data, and data of the depth of the object being observed which is included in the image.

The input image processing unit 12 is a processing unit that generates a left-eye image and a right-eye image, which are used for stereoscopic vision, from the input image. Specifically, if the input image includes a left-eye image and a right-eye image, the input image processing unit 12 extracts the left-eye image and the right-eye image from the input image. If the input image includes image data and data of the depth of the object being observed which is included in the image, the input image processing unit 12 converts the data of the depth into disparity, and displaces the image data in the horizontal direction by an amount corresponding to the disparity to generate a left-eye image and a right-eye image.

The image adjustment unit 13 is a processing unit that adjusts a disparity value in the horizontal direction between the left-eye image and the right-eye image. Specifically, the image adjustment unit 13 extracts feature points from each of the left-eye image and the right-eye image. The image adjustment unit 13 calculates the number of feature points in the left-eye image that do not correspond to the extracted feature points in the right-eye image and that are spaced away by a certain distance from the feature points in the right-eye image. In addition, the image adjustment unit 13 calculates the amount of adjustment of a disparity value between the left-eye image and the right-eye image based on the calculated number of feature points in the left-eye image. The image adjustment unit 13 will be described in detail below with reference to FIG. 3.

The display control unit 14 is a processing unit that controls the display processing of the left-eye image and the right-eye image in accordance with the amount of adjustment of a disparity value calculated by the image adjustment unit 13. Specifically, the display control unit 14 acquires information on an amount of adjustment h of a disparity value between the left-eye image and the right-eye image from the image adjustment unit 13, and causes the left-eye image and the right-eye image to be displayed on the display unit 15 in such a manner the left-eye image and the right-eye image are displaced by the amount of adjustment h.

FIG. 2 includes diagrams explaining a process for the display control of the left-eye image and the right-eye image. FIG. 2(A) illustrates a left-eye image 30a and a right-eye image 30b that are generated from an input image.

If the amount of adjustment h of a disparity value acquired from the image adjustment unit 13 has a negative value, the display control unit 14 shifts the left-eye image 30a to the left by h/2 pixels, and the right-eye image 30b to the right by h/2 pixels. As a result, a left-eye image 31a and a right-eye image 31b illustrated in FIG. 2(B) are displayed on the display unit 15. In this case, areas each having a width of h/2 pixels where no images are displayed are generated respectively on the right side of the left-eye image 31a and the left side of the right-eye image 31b.

If the amount of adjustment h of a disparity value acquired from the image adjustment unit 13 has a positive value, the display control unit 14 shifts the left-eye image 30a to the right by h/2 pixels, and the right-eye image 30b to the left by h/2 pixels. As a result, a left-eye image 32a and a right-eye image 32b illustrated in FIG. 2(C) are displayed on the display unit 15. In this case, areas each having a width of h/2 pixels where no images are displayed are generated respectively on the left side of the left-eye image 32a and the right side of the right-eye image 32b.

If the amount of adjustment h of a disparity value is 0, the left-eye image 30a and the right-eye image 30b are not shifted.

The display unit 15 is a display device such as a display that displays a left-eye image and a right-eye image under control of the display control unit 14. The glasses synchronization unit 16 is a processing unit that synchronizes the timing of display using the display unit 15 with the timing at which shutter glasses 20 block the left eye's view or right eye's view. Specifically, the glasses synchronization unit 16 outputs a control signal to the communication processing unit 17 to perform control so that the shutter glasses 20 block the right eye's view while the display unit 15 displays the left-eye image and the shutter glasses 20 block the left eye's view while the display unit 15 displays the right-eye image.

The communication processing unit 17 is a processing unit that transmits the control signal output from the glasses synchronization unit 16 to the shutter glasses 20 via infrared communication or the like. Upon receiving the control signal, the shutter glasses 20 block the left eye's view or right eye's view at the timing specified by the control signal.

Figure 3:
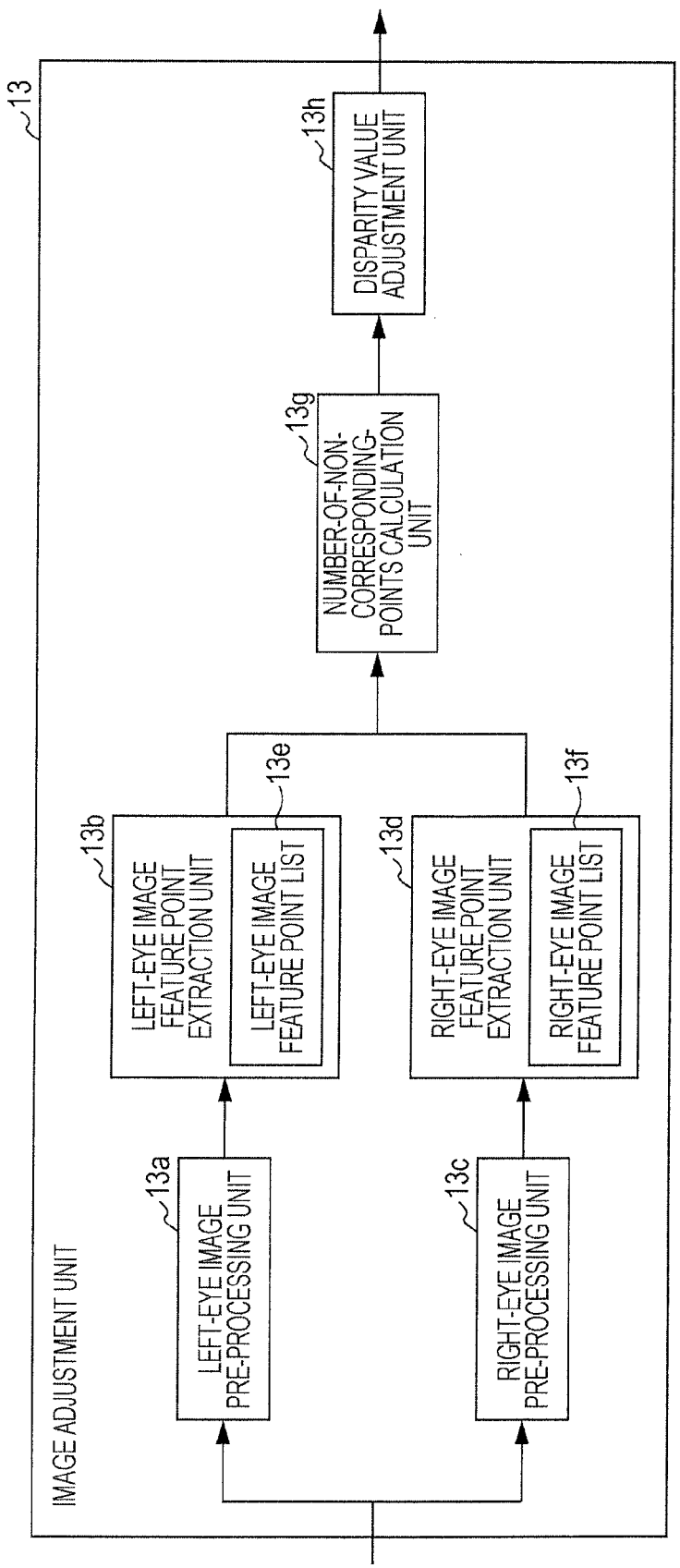
FIG. 3 is a diagram illustrating an example of the configuration of an image adjustment unit according to the first embodiment of the present invention.

Next, the configuration of the image adjustment unit 13 according to the first embodiment illustrated in FIG. 1 will be described in detail. FIG. 3 is a diagram illustrating an example of the configuration of the image adjustment unit 13 according to the first embodiment illustrated in FIG. 1. As illustrated in FIG. 3, the image adjustment unit 13 includes a left-eye image pre-processing unit 13a, a left-eye image feature point extraction unit 13b, a right-eye image pre-processing unit 13c, a right-eye image feature point extraction unit 13d, a number-of-non-corresponding-points calculation unit 13g, and a disparity value adjustment unit 13h.

The left-eye image pre-processing unit 13a is a processing unit that converts the left-eye image (RGB image) output from the input image processing unit 12 in FIG. 1 into a luminance image. The left-eye image pre-processing unit 13a may be configured to further perform processing such as image size reduction processing for reducing the amount of calculation and noise removal processing.

The left-eye image feature point extraction unit 13b is a processing unit that performs a process for extracting feature points in the luminance image generated from the left-eye image. Specifically, the left-eye image feature point extraction unit 13b performs filtering on the luminance image using a filter having certain response characteristics. The left-eye image feature point extraction unit 13b then extracts, as a feature point, a pixel having a larger pixel value than a certain threshold value in the luminance image obtained as a result of filtering.

For example, the left-eye image feature point extraction unit 13b performs filtering of the luminance image using a bandpass filter. The bandpass filter may be a one-dimensional filter or a two-dimensional filter.

Further, the left-eye image feature point extraction unit 13b detects, as a feature point, a pixel having a pixel value whose absolute value is greater than or equal to the certain threshold value in a luminance image obtained after filtering using the bandpass filter. The left-eye image feature point extraction unit 13b temporarily stores the coordinates $(x_{Li}, Y_{Li})$ of detected feature points ($1 \leq i \leq M$: M is the number of detected feature points) in an internal memory as a left-eye image feature point list 13e, and outputs the stored left-eye image feature point list 13e to the number-of-non-corresponding-points calculation unit 13g.

The right-eye image pre-processing unit 13c is a processing unit that converts the right-eye image (RGB image) output from the input image processing unit 12 in FIG. 1 into a luminance image. The right-eye image pre-processing unit 13c may be configured to further perform processing such as image size reduction processing for reducing the amount of calculation and noise removal processing.

The right-eye image feature point extraction unit 13d performs a process for extracting feature points in the luminance image generated from the right-eye image. Specifically, the right-eye image feature point extraction unit 13d performs filtering on the luminance image generated from the right-eye image using the same filter as the filter used by the left-eye image feature point extraction unit 13b. The right-eye image feature point extraction unit 13d then extracts, as a feature point, a pixel having a larger pixel value than a certain threshold value in the luminance image obtained as a result of filtering. The certain threshold value is set to the same value as the threshold value used when the left-eye image feature point extraction unit 13b extracts feature points.

For example, if the left-eye image feature point extraction unit 13b uses a bandpass filter, the right-eye image feature point extraction unit 13d performs filtering of the luminance image using the bandpass filter.

Further, the right-eye image feature point extraction unit 13d detects, as a feature point, a pixel having a pixel value whose absolute value is greater than or equal to the certain threshold value in a luminance image obtained after filtering using the bandpass filter. The right-eye image feature point extraction unit 13d temporarily stores the coordinates ($x_{Rj}$, $y_{Rj}$) of detected pixels ($1 \leq j \leq N$: N is the number of detected feature points) in an internal memory as a right-eye image feature point list 13f, and outputs the stored right-eye image feature point list 13f to the number-of-non-corresponding-points calculation unit 13g.

Here, a bandpass filter can be regarded as a model that simulates the human visual characteristics because the human visual system has band-pass spatial frequency sensitivity characteristics for the luminance component of an image.

In this way, the filtering of a luminance image using a bandpass filter that simulates the human visual characteristics allows effective extraction of feature points that are more easily perceived by persons. Furthermore, the adjustment of a disparity value between the left-eye image and the right-eye image using the extracted feature points enables the obtainment of a left-eye image and a right-eye image between which disparity values have been appropriately adjusted to the human visual system.

The number-of-non-corresponding-points calculation unit 13g is a processing unit that calculates, in a case where the feature points in the left-eye image are shifted a certain distance in the horizontal direction, the number of feature points in the left-eye image that do not correspond to the feature points in the right-eye image, for each shift distance of the feature points in the left-eye image.

Specifically, the number-of-non-corresponding-points calculation unit 13g acquires the left-eye image feature point list 13e and the right-eye image feature point list 13f from the left-eye image feature point extraction unit 13b and the right-eye image feature point extraction unit 13d, respectively, and calculates the degree-of-non-correspondence distribution U(s) with respect to respective amounts of shift s (pixel values) in the horizontal direction of the left-eye image using Expressions (2) to (4) as follows:

[Math. 2]
$$U(s) = \sum_{i=1}^{M} F(A_i(s)) \qquad (2)$$

[Math. 3]
$$F(z) = \begin{cases} 0 & \text{if } (z = 0) \\ 1 & \text{otherwise} \end{cases} \qquad (3)$$

[Math. 4]
$$A_i(s) = \prod_{j=1}^{N} \left( (x_{Li} + s - x_{Rj})^2 + \left( \prod_{t=t1}^{t2} (y_{Li} + t - y_{Rj}) \right)^2 \right) \qquad (4)$$

where the amount of shift s satisfies the condition $s1 \leq s \leq s2$. The values s1 and s2 are a predetermined minimum value and maximum value of the amount of shift s, respectively. A positive amount of shift s indicates a shift of the left-eye image to the right, and a negative amount of shift s indicates a shift of the left-eye image to the left.

Further, the amount of shift t satisfies the condition $t1 \leq t \leq t2$. The values t1 and t2 are a constant less than or equal to 0 and a constant greater than or equal to 0, respectively. The condition $t1 \leq t \leq t2$ represents the allowed range of vertical retinal disparity. A positive amount of shift t indicates a shift of the left-eye image downward, and a negative amount of shift t indicates a shift of the left-eye image upward.

The number-of-non-corresponding-points calculation unit 13g may calculate the degree-of-non-correspondence distribution U(s) with respect to all the amounts of shift s satisfying the relationship $s1 \leq s \leq s2$ or may calculate the degree-of-non-correspondence distribution U(s) at certain intervals (for example, every second pixel) of the amounts of shift s satisfying the relationship $s1 \leq s \leq s2$.

The degree-of-non-correspondence distribution U(s) implies, in a case where a left eye image is shifted by the amount s in the horizontal direction in the respective images projected onto the retinas of the left eye and the right eye by convergence or divergence movement, the number of feature points in the left eye image that do not correspond to the feature points in a right eye image.

In the foregoing, the number-of-non-corresponding-points calculation unit 13g calculates the number of feature points in the left-eye image that do not correspond to the feature points in the right-eye image, for each shift distance of the feature points in the left-eye image, in a case where the feature points in the left-eye image are shifted a certain distance in the horizontal direction. However, the number-of-non-corresponding-points calculation unit 13g may calculate, in a case where the feature points in the right-eye image are shifted a certain distance in the horizontal direction, the number of feature points in the right-eye image that do not correspond to the feature points in the left-eye image, for each shift distance of the feature points in the right-eye image.

In the above case, Expressions (2) and (4) are replaced by Expressions (5) and (6) as follows, respectively:

[Math. 5]
$$U(s) = \sum_{j=1}^{N} F(A_j(s)) \qquad (5)$$

[Math. 6]
$$A_j(s) = \prod_{i=1}^{M} \left( (x_{Rj} - s - x_{Li})^2 + \left( \prod_{t=t1}^{t2} (y_{Rj} - t - y_{Li}) \right)^2 \right) \qquad (6)$$

The disparity value adjustment unit 13h is a processing unit that adjusts a disparity value between the left-eye image and the right-eye image in accordance with the degree-of-non-correspondence distribution U(s) calculated by the number-of-non-corresponding-points calculation unit 13g.

Specifically, the disparity value adjustment unit 13h determines whether the degree-of-non-correspondence distribution U(s) includes an area having a value less than or equal to a certain threshold value K. If the degree-of-non-correspondence distribution U(s) includes an area having a value less than or equal to the certain threshold value K, the disparity value adjustment unit 13h detects the value of the amount of shift s at which the degree-of-non-correspondence distribution U(s) is minimum in the area. Then, the disparity value adjustment unit 13h outputs the detected value of the amount of shift s to the display control unit 14 as the amount of adjustment of a disparity value. If the degree-of-non-correspondence distribution U(s) does not include an area having value less than or equal to the certain threshold value K, the disparity value adjustment unit 13h outputs an error signal indicating that the correspondence of feature points is not possible to the display control unit 14.

Figure 4:
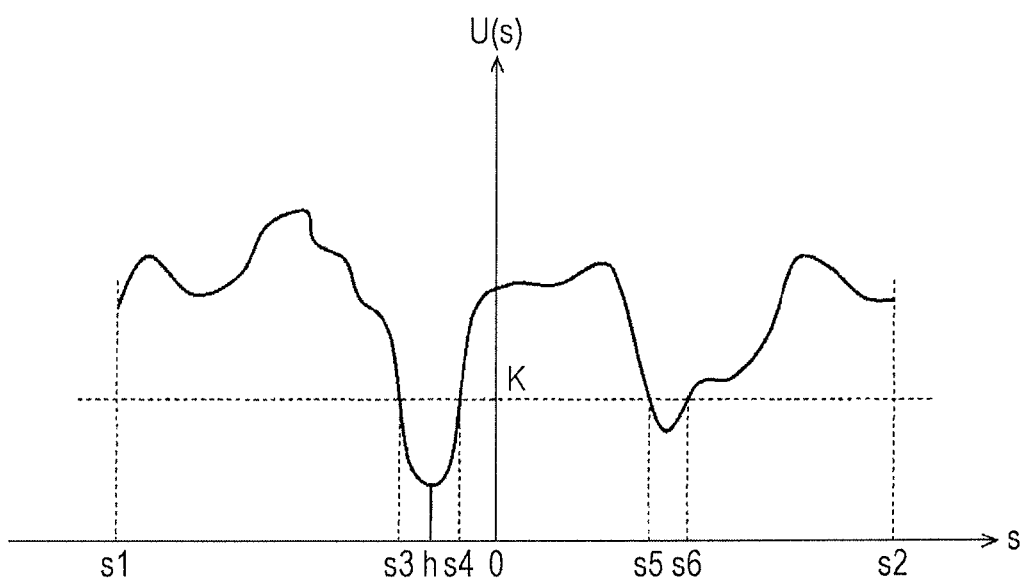
FIG. 4 is a diagram illustrating an example of calculation results of a degree-of-non-correspondence distribution.

FIG. 4 is a diagram illustrating an example of calculation results of the degree-of-non-correspondence distribution U(s). The degree-of-non-correspondence distribution U(s) illustrated in FIG. 4 shows that the degree-of-non-correspondence distribution U(s) includes areas (s3≤s≤s4 and s5≤s≤s6) having a value less than or equal to the threshold value K. In these areas, the degree-of-non-correspondence distribution U(s) is minimum when the amount of shift s is h.

Accordingly, the disparity value adjustment unit 13h detects the value h of the amount of shift s at which the degree-of-non-correspondence distribution U(s) is minimum, and outputs the detected value h to the display control unit 14 as the amount of adjustment of a disparity value. After that, the display control unit 14 performs display control in the manner described with reference to FIG. 2 in accordance with the amount of adjustment h. Thus, it is possible to suppress the occurrence of binocular rivalry.

Figure 5:
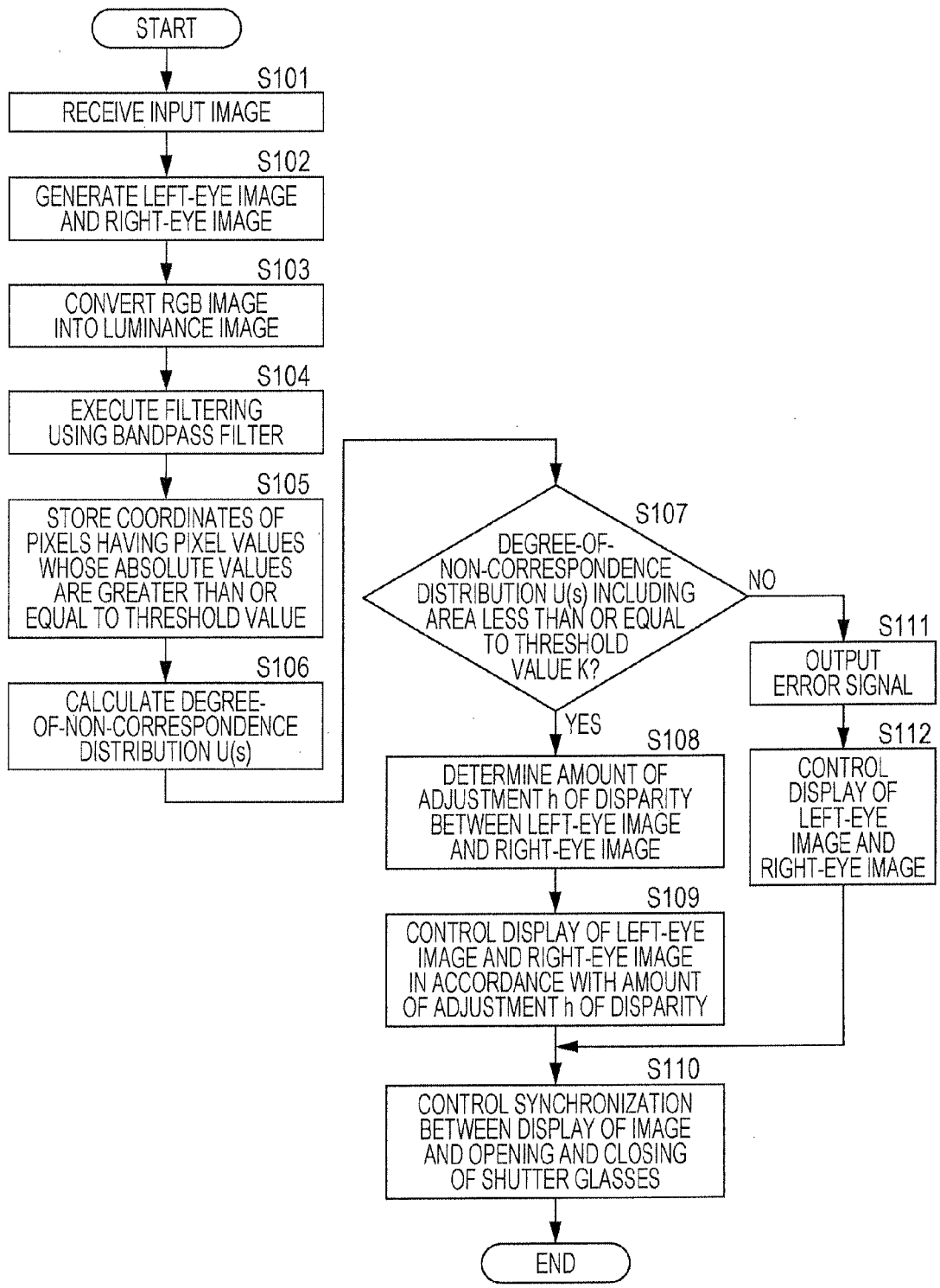
FIG. 5 is a flowchart illustrating an example of the processing procedure of image processing according to the first embodiment of the present invention.

The processing procedure of image processing according to the present invention will now be described. FIG. 5 is a flowchart illustrating an example of the processing procedure of the image processing according to the present invention. As illustrated in FIG. 5, first, the input unit 11 of the image processing device 10 receives an input image (step S101). Then, the input image processing unit 12 generates a left-eye image and a right-eye image from the received input image (step S102).

After that, the left-eye image pre-processing unit 13a converts the left-eye image (RGB image) into a luminance image, and the right-eye image pre-processing unit 13c converts the right-eye image (RGB image) into a luminance image (step S103).

Then, the left-eye image pre-processing unit 13a executes filtering on the luminance image of the left-eye image using a bandpass filter, and the right-eye image pre-processing unit 13c executes filtering on the luminance image of the right-eye image using the bandpass filter (step S104).

Subsequently, the left-eye image feature point extraction unit 13b stores the coordinates of the pixels having pixel values whose absolute values are greater than or equal to a certain threshold value in the luminance image of the left-eye image obtained after the execution of filtering in the internal memory as the left-eye image feature point list 13e. Further, the right-eye image feature point extraction unit 13d stores the coordinates of the pixels having pixel values whose absolute values are greater than or equal to the certain threshold value in the luminance image of the right-eye image obtained after the execution of filtering in the internal memory as the right-eye image feature point list 13f (step S105).

After that, the number-of-non-corresponding-points calculation unit 13g calculates the degree-of-non-correspondence distribution U(s) with respect to respective amounts of shift s in the horizontal direction of the left-eye image using the values of the coordinates of the feature points stored as the left-eye image feature point list 13e and the right-eye image feature point list 13f (step S106).

Then, the disparity value adjustment unit 13h determines whether the degree-of-non-correspondence distribution U(s) includes an area having a value less than or equal to the certain threshold value K (step S107). If the degree-of-non-correspondence distribution U(s) includes a portion having a value less than or equal to the certain threshold value K (YES in step S107), the disparity value adjustment unit 13h determines that the value h of s at which the degree-of-non-correspondence distribution U(s) is minimum within the area having a value less than or equal to the threshold value K in the degree-of-non-correspondence distribution U(s) is the amount of adjustment of a disparity value between the left-eye image and the right-eye image (step S108).

Then, the display control unit 14 shifts the left-eye image and the right-eye image in the horizontal direction by the determined amount of adjustment h of a disparity value, and controls the display unit 15 to display a left-eye image and a right-eye image between which the disparity has been adjusted on the display unit 15 (step S109). It is desirable that the amount of shift of each of the left-eye image and the right-eye image in the horizontal direction be h/2.

Then, the glasses synchronization unit 16 transmits a control signal to the shutter glasses 20 via the communication processing unit 17 to synchronize the timing at which the display unit 15 displays a left-eye image or a right-eye image with the timing at which the shutter glasses 20 block the left eye's view or right eye's view (step S110). After that, this image processing operation ends.

If it is determined in step S107 that the degree-of-non-correspondence distribution U(s) does not include a portion having a value less than or equal to the predetermined threshold value K (NO in step S107), the disparity value adjustment unit 13h outputs an error signal to the display control unit 14 (step S111).

Upon receiving the error signal, the display control unit 14 controls the display unit 15 to display the left-eye image and right-eye image acquired from the input image processing unit 12 on the display unit 15 without adjusting the disparity between the left-eye image and the right-eye image (step S112).

Then, the glasses synchronization unit 16 transmits a control signal to the shutter glasses 20 via the communication processing unit 17 to synchronize the timing at which the display unit 15 displays a left-eye image or a right-eye image with the timing at which the shutter glasses 20 block the left eye's view or right eye's view (step S110). After that, this image processing operation ends.

In a case where the image processing device 10 is to display a moving image, the image processing operation described above is repeatedly executed on each of input images constituting the moving image.

As described above, in the first embodiment, the left-eye image feature point extraction unit 13b and the right-eye image feature point extraction unit 13d extract feature points from a left-eye image and a right-eye image, respectively. Further, the number-of-non-corresponding-points calculation unit 13g calculates, in a case where the extracted feature points in one of the left-eye image and right-eye image are shifted a certain distance in the horizontal direction, the number of feature points in the one image that do not correspond to the feature points in the other image, for each shift distance. In addition, the disparity value adjustment unit 13h adjusts a disparity value between the left-eye image and the right-eye image in accordance with the calculated numbers for the respective shift distances. Thus, it is possible to display an image that is less likely to cause binocular rivalry.

Additionally, the left-eye image feature point extraction unit 13b and the right-eye image feature point extraction unit 13d perform filtering on luminance images generated from the left-eye image and the right-eye image using a filter having certain response characteristics, and extract, as feature points, pixels having larger pixel values than a certain threshold value in a left-eye image and a right-eye image obtained as a result of filtering. Accordingly, feature points are extracted through filtering using a filter having filter characteristics that accurately simulate the human visual characteristics, and the feature points in the left-eye image and the feature points in the right-eye image are associated with each other. Thus, it is possible to display an image that is less likely to cause binocular rivalry.

Furthermore, the left-eye image feature point extraction unit 13b and the right-eye image feature point extraction unit 13d execute filtering using a bandpass filter. Accordingly, the filtering of luminance images using a bandpass filter that simulates the human visual characteristics enables effective extraction of feature points that are easily perceived by persons. Furthermore, the adjustment of a disparity value between the left-eye image and the right-eye image using the extracted feature points allows the obtainment of a left-eye image and a right-eye image between which disparity values have been appropriately adjusted to the human visual system.

Furthermore, the disparity value adjustment unit 13h is configured to adjust a disparity value between the left-eye image and the right-eye image in accordance with a frequency distribution (degree-of-non-correspondence distribution U(s)) where the frequency is represented by the number calculated by the number-of-non-corresponding-points calculation unit 13g and the class is represented by the amount of shift s. Thus, the value of amount of shift s at which the degree-of-non-correspondence distribution U(s) is minimum can be easily detected.

In addition, the image processing device 10 further includes the display control unit 14 that controls the display processing of a left-eye image and a right-eye image in accordance with the amount of adjustment h of the disparity value determined by the disparity value adjustment unit 13h. Thus, it is possible to control the display of an image that is less likely to cause binocular rivalry.

(Second Embodiment)

In a second embodiment, a description will be given of a case where feature points are extracted from a left-eye image and a right-eye image by applying filtering to the left-eye image and the right-eye image using a plurality of filters having different response characteristics.

First, an image processing device according to a second embodiment of the present invention will be described. The image processing device according to the second embodiment is different from the image processing device 10 illustrated in FIG. 1 only in terms of the function of the image adjustment unit 13. Thus, the description will focus on an image adjustment unit 13 according to the second embodiment.

FIG. 6 is a diagram illustrating an example of the configuration of the image adjustment unit 13 according to the second embodiment of the present invention. The image adjustment unit 13 includes a left-eye image pre-processing unit 13a, left-eye image feature point extraction units $13b_1$ to $13b_w$, a right-eye image pre-processing unit 13c, right-eye image feature point extraction units $13d_1$ to $13d_w$, a number-of-non-corresponding-points calculation unit 13g, and a disparity value adjustment unit 13h.

The left-eye image pre-processing unit 13a is a processing unit that converts the left-eye image (RGB image) output from the input image processing unit 12 in FIG. 1 into a luminance image. The left-eye image pre-processing unit 13a may be configured to further perform processing such as image size reduction processing for reducing the amount of calculation and noise removal processing.

The left-eye image feature point extraction units $13b_1$ to $13b_w$ are processing units that perform a process for extracting feature points from the luminance image generated from the left-eye image. Specifically, the left-eye image feature point extraction units $13b_1$ to $13b_w$ perform filtering on the left-eye image using respective filters having different response characteristics, the number of which is equal to w, and extract, as feature points, pixels having larger pixel values than a certain threshold value in a left-eye image obtained as a result of the individual filtering.

For example, the left-eye image feature point extraction units $13b_1$ to $13b_w$ perform filtering of the luminance image using bandpass filters having different response characteristics, the number of which is equal to w. One such bandpass filter may be, for example, a Gabor filter. A Gabor filter is expressed by Expression (7).

[Math. 7]

$$\psi_{k,\theta}(x, y) = \frac{k^2}{\sigma^2}\exp\left[-\frac{k^2(x^2+y^2)}{2\sigma^2}\right]\left\{\exp\left[ik(x\cos\theta + y\sin\theta) - \exp\left(-\frac{\sigma^2}{2}\right)\right]\right\} \quad (7)$$

where k, θ, and σ are certain parameters.

This Gabor filter is configured to change the parameter k to change the frequency of the edges to be extracted, and to change the parameter θ to change the direction of the edges to be extracted.

The left-eye image feature point extraction units $13b_1$ to $13b_w$ execute filtering of the luminance image generated from the left-eye image using Gabor filters having different combinations of the above parameters.

Further, each of the left-eye image feature point extraction units $13b_1$ to $13b_w$ detects, as a feature point, a pixel having a pixel value whose absolute value is greater than or equal to a predetermined threshold value in a luminance image obtained after filtering. The left-eye image feature point extraction units $13b_1$ to $13b_w$ temporarily store the coordinates of detected pixels $(x_{Li,p}, y_{Li,p})$ ($1 \leq i \leq M_p$, $1 \leq p \leq w$: p is the index indicating one of the Gabor filters having different combinations of parameters, and $M_p$ is the number of feature points detected using the Gabor filter corresponding to the index p) in an internal memory as left-eye image feature point lists $13e_1$ to $13e_w$, and output the stored left-eye image feature point lists $13e_1$ to $13e_w$ to the number-of-non-corresponding-points calculation unit 13g. Here, the left-eye image feature point list $13e_p$ ($1 \leq p \leq w$) corresponds to the coordinates of the pixel detected using the Gabor filter corresponding to the index p.

The right-eye image pre-processing unit 13c is a processing unit that converts the right-eye image (RGB image) output from the input image processing unit 12 in FIG. 1 into a luminance image. The right-eye image pre-processing unit 13c may be configured to further perform processing such as image size reduction processing for reducing the amount of calculation and noise removal processing.

The right-eye image feature point extraction units $13d_1$ to $13d_w$ perform a process for extracting feature points in the luminance image generated from the right-eye image. Specifically, the right-eye image feature point extraction units $13d_1$ to $13d_w$ perform filtering of the luminance image using bandpass filters, the number of which is equal to w, which is the same as the number of bandpass filters used in the left-eye image feature point extraction units $13b_1$ to $13b_w$.

For example, in a case where each of the left-eye image feature point extraction units $13b_1$ to $13b_w$ is to perform filtering using a Gabor filter, the right-eye image feature point extraction unit $13d_p$ ($1 \leq p \leq w$) performs filtering using a Gabor filter in which parameters (k, θ, and σ in Expression (7)) similar to those for the left-eye image feature point extraction unit $13b_p$ are set.

Further, each of the right-eye image feature point extraction units $13d_1$ to $13d_w$ detects, as a feature point, a pixel having a pixel value whose absolute value is greater than or equal to a predetermined threshold value in a luminance image obtained after filtering. The right-eye image feature point extraction units $13d_1$ to $13d_w$ temporarily store the coordinates of detected pixels $(x_{Rj,p}, y_{Rj,p})$ ($1 \leq j \leq N_p$, $1 \leq p \leq w$: $N_p$ is the number of feature points detected using the Gabor filter corresponding to the index p) in an internal memory as right-eye image feature point lists $13f_1$ to $13f_w$, and output the stored right-eye image feature point lists $13f_1$ to $13f_w$ to the number-of-non-corresponding-points calculation unit $13g$. Here, the right-eye image feature point list $13f_p$ ($1 \leq p \leq w$) corresponds to the coordinates of the pixel detected using the Gabor filter corresponding to the index p.

In this way, filtering using Gabor filters enables the detection of edges of various frequencies and directions, and enables effective extraction of feature points.

The number-of-non-corresponding-points calculation unit $13g$ is a processing unit that calculates, in a case where the feature points in the left-eye image are shifted a certain distance in the horizontal direction, the number of feature points in the left-eye image that do not correspond to the feature points in the right-eye image, for each shift distance of the feature point in the left-eye image.

Specifically, the number-of-non-corresponding-points calculation unit $13g$ acquires the left-eye image feature point lists $13e_1$ to $13e_w$ and the right-eye image feature point lists $13f_1$ to $13f_w$ from the left-eye image feature point extraction units $13b_1$ to $13b_w$ and the right-eye image feature point extraction units $13d_1$ to $13d_w$, respectively, and calculates the degree-of-non-correspondence distribution $V_p(s)$ ($1 \leq p \leq w$) for each filter with respect to respective amounts of shift s in the horizontal direction of the left-eye image using Expressions (8) to (10) as follows:

[Math. 8]
$$V_p(s) = \sum_{i=1}^{M_p} F(A_{i,p}(s)) \quad (8)$$

[Math. 9]
$$F(z) = \begin{cases} 0 & \text{if } (z=0) \\ 1 & \text{otherwise} \end{cases} \quad (9)$$

[Math. 10]
$$A_{i,p}(s) = \prod_{j=1}^{N_p} \left( (x_{Li,p} + s - x_{Rj,p})^2 + \left( \prod_{t=t1}^{t2} (y_{Li,p} + t - y_{Rj,p}) \right)^2 \right) \quad (10)$$

where the amount of shift s satisfies the condition $s1 \leq s \leq s2$. The values s1 and s2 are a predetermined minimum value and maximum value of the amount of shift s, respectively. A positive amount of shift s indicates a shift of the left-eye image to the right, and a negative amount of shift s indicates a shift of the left-eye image to the left.

Further, the amount of shift t satisfies the condition $t1 \leq t \leq t2$. The values t1 and t2 are a constant less than or equal to 0 and a constant greater than or equal to 0, respectively. The condition $t1 \leq t \leq t2$ represents the allowed range of vertical retinal disparity. A positive amount of shift t indicates a shift of the left-eye image downward, and a negative amount of shift s indicates a shift of the left-eye image upward.

After that, the number-of-non-corresponding-points calculation unit $13g$ calculates the degree-of-non-correspondence distribution U(s) with respect to respective amounts of shift s in the horizontal direction of the left-eye image using Expression (11) as follows:

[Math. 11]
$$U(s) = \sum_{p=1}^{w} V_p(s) \quad (11)$$

In the foregoing, the number-of-non-corresponding-points calculation unit $13g$ calculates the number of feature points in the left-eye image that do not correspond to the feature points in the right-eye image, for each shift distance of the feature points in the left-eye image, in a case where the feature points in the left-eye image are shifted a certain distance in the horizontal direction. However, the number-of-non-corresponding-points calculation unit $13g$ may calculate, in a case where the feature points in the right-eye image are shifted a certain distance in the horizontal direction, the number of feature points in the right-eye image that do not correspond to the feature points in the left-eye image, for each shift distance of the feature points in the right-eye image.

In the above case, Expressions (8) and (10) are replaced by Expressions (12) and (13) as follows, respectively:

[Math. 12]
$$V_p(s) = \sum_{j=1}^{N_p} F(A_{j,p}(s)) \quad (12)$$

[Math. 13]
$$A_{j,p}(s) = \prod_{i=1}^{M_p} \left( (x_{Rj,p} - s - x_{Li,p})^2 + \left( \prod_{t=t1}^{t2} (y_{Rj,p} - t - y_{Li,p}) \right)^2 \right) \quad (13)$$

The disparity value adjustment unit $13h$ is a processing unit that adjusts a disparity value between the left-eye image and the right-eye image in accordance with the degree-of-non-correspondence distribution U(s) calculated by the number-of-non-corresponding-points calculation unit $13g$.

Specifically, the disparity value adjustment unit 13h determines whether the degree-of-non-correspondence distribution U(s) includes an area having a value less than or equal to a certain threshold value K. If the degree-of-non-correspondence distribution U(s) includes an area having a value less than or equal to the threshold value K, the disparity value adjustment unit 13h detects the value of the amount of shift s at which the degree-of-non-correspondence distribution U(s) is minimum in the area. Then, the disparity value adjustment unit 13h outputs the detected value of the amount of shift s to the display control unit 14 as the amount of adjustment of a disparity value. If the degree-of-non-correspondence distribution U(s) does not include an area having a value less than or equal to the certain threshold value K, the disparity value adjustment unit 13h outputs an error signal indicating that the correspondence of feature points is not possible to the display control unit 14.

In the second embodiment, the number-of-non-corresponding-points calculation unit 13g calculates the degree-of-non-correspondence distribution U(s) using Expression (11). However, the equation for calculating the degree-of-non-correspondence distribution U(s) is not limited to this equation. For example, the number-of-non-corresponding-points calculation unit 13g may calculate the degree-of-non-correspondence distribution U(s) using the following equation:

[Math. 14]

$$U(s) = \sum_{p=1}^{w} a_p V_p(s) \qquad (14)$$

where $a_p$ ($1 \leq p \leq w$) is a weight assigned to the degree-of-non-correspondence distribution $V_p(s)$ for each filter.

As described above, in the second embodiment, the left-eye image feature point extraction units $13b_1$ to $13b_w$ and the right-eye image feature point extraction units $13d_1$ to $13d_w$ are configured to execute filtering by applying a plurality of filters having different response characteristics to both the left-eye image and the right-eye image, and to extract, as feature points in the left-eye image and feature points in the right-eye image, pixels having larger pixel values than a certain threshold value in a left-eye image and right-eye image obtained as a result of respective filtering, respectively. Thus, it is possible to accurately simulate the human visual characteristics and to display an image that is less likely to cause binocular rivalry.

While the foregoing description has been given mainly of embodiments of an image processing device and an image processing method, the present invention is not limited to these embodiments. The present invention may also be carried out by, as an aspect, a computer program for implementing the function of the image processing device or a computer-readable recording medium having the computer program recorded thereon.

The recording medium may be implemented using any type such as a disk type (such as a magnetic disk or an optical disk), a card type (such as a memory card or an optical card), a semiconductor memory type (such as a ROM or a non-volatile memory), or a tape type (such as a magnetic tape or a cassette tape).

Such recording media having recorded thereon a computer program for implementing the function of the image processing device according to each of the foregoing embodiments or a computer program for causing a computer to execute the image processing method are distributed, thereby achieving cost reduction and increased portability and general usability.

Such a recording medium is set in a computer, and the computer reads the computer program recorded on the recording medium and stores the computer program in a memory. A processor (CPU: Central Processing Unit, MPU: Micro Processing Unit) included in the computer reads the computer program from the memory and executes the computer program. This makes it possible to implement the function of the image processing device according to each of the embodiments and execute the image processing method.

Furthermore, some or all the elements constituting the image processing device according to each of the foregoing embodiments may be implemented as LSI (Large Scale Integration) units that are typically integrated circuits. The elements constituting the image processing device may be individually built into chips, or some or all the elements may be integrated into a chip. Moreover, integrated circuits may not necessarily be designed using LSI, and may be constructed by a dedicated circuit or a general-purpose processor. In addition, if an integrated circuit technology will emerge as an alternative of LSI due to the advancement of semiconductor technology, an integrated circuit based on the emerging technology may be used.

In addition, the present invention is not limited to the embodiments described above, and various modifications or alterations can be made without departing from the scope of the present invention.

For example, in the first and second embodiments described above, the number-of-non-corresponding-points calculation unit 13g calculates the degree-of-non-correspondence distribution U(s) using Expression (4) or (10). However, the equation for calculating the degree-of-non-correspondence distribution U(s) is not limited to these equations. For example, the number-of-non-corresponding-points calculation unit 13g may calculate the degree-of-non-correspondence distribution U(s) using Expressions (15) and (16) as follows instead of Expression (4):

[Math. 15]

$$A_i(s) = \prod_{j=1}^{N} \left( (x_{Li} + s - x_{Rj})^2 + \left( \prod_{t=t1}^{t2} (y_{Li} + t - y_{Rj}) \right)^2 + G(x_{Li}, y_{Li}, x_{Rj}, y_{Rj}) \right) \qquad (15)$$

[Math. 16]

$$G(x_{Li}, y_{Li}, x_{Rj}, y_{Rj}) = \begin{cases} 0 & (\text{if } |L(x_{Li}, y_{Li}) - R(x_{Rj}, y_{Rj})| < TH) \\ 1 & (\text{otherwise}) \end{cases} \qquad (16)$$

where L(x, y) is the pixel value at the coordinates (x, y) in a luminance image of a left-eye image subjected to filtering using a filter having certain response characteristics, and R(x, y) is the pixel value at the coordinates (x, y) in a luminance image of a right-eye image subjected to filtering using a filter having certain response characteristics. Further, TH is a preset threshold value.

Alternatively, for example, the number-of-non-corresponding-points calculation unit 13g may calculate the degree-of-non-correspondence distribution U(s) using Expressions (17) and (18) as follows instead of Expression (10):

[Math. 17]

$$A_{i,p}(s) = \prod_{j=1}^{N_p} \left( (x_{Li,p} + s - x_{Rj,p})^2 + \left( \prod_{t=t1}^{t2} (y_{Li,p} + t - y_{Rj,p}) \right)^2 + G(x_{Li,p}, y_{Li,p}, x_{Rj,p}, y_{Rj,p}) \right) \quad (17)$$

[Math. 18]

$$G(x_{Li,p}, y_{Li,p}, x_{Rj,p}, y_{Rj}, p) = \begin{cases} 0 & (\text{if } |L(x_{Li}, y_{Li}) - R(x_{Rj}, y_{Rj})| < TH) \\ 1 & (\text{otherwise}) \end{cases} \quad (18)$$

where $L(x, y)$, $R(x, y)$, and TH are similar to $L(x, y)$ and $R(x, y)$, and TH in Expression (16).

Expressions (15) to (18) are equations for calculating the number of feature points in the left-eye image that do not correspond to the feature points in the right-eye image, where a feature point in the left-eye image having a pixel value that is spaced away from the pixel value of the feature point in the right-eye image by the threshold value TH or more is included in the feature points in the left-eye image that do not correspond to the feature points in the right-eye image. That is, the condition that correspondence of feature points takes place only when pixel values are close to each other is added to Expression (4) or (10). Alternatively, the number-of-non-corresponding-points calculation unit 13g may calculate the number of feature points in the right-eye image that do not correspond to the feature points in the left-eye image, where a feature point in the right-eye image having a pixel value that is spaced away from the pixel value of the feature point in the left-eye image by the threshold value TH or more is included in the feature points in the right-eye image that do not correspond to the feature points in the left-eye image.

In this way, the number-of-non-corresponding-points calculation unit 13g causes a feature point in the one image having a pixel value that is spaced away from the pixel value of the feature point in the other image by a certain value or more to be included in feature points in the one image that do not correspond to the feature points in the other image. Accordingly, the human visual characteristics can be more accurately simulated by taking pixel values into account.

In the first and second embodiments described above, furthermore, the disparity value adjustment unit 13h sets the value of the amount of shift s at which the degree-of-non-correspondence distribution U(s) is minimum in an area where the degree-of-non-correspondence distribution U(s) is less than or equal to the threshold value K as the amount of adjustment of a disparity value. However, the method for setting amount of adjustment of a disparity value is not limited to this method.

For example, the disparity value adjustment unit 13h may set the amount of shift s whose absolute value is minimum in an area where the degree-of-non-correspondence distribution U(s) is less than or equal to the threshold value K (in the example in FIG. 4, s4) as the amount of adjustment of a disparity value. This enables the adjustment of disparity without much changing a disparity value between the original left-eye image and right-eye image.

The disparity value adjustment unit 13h may also set the amount of shift s that is maximum or minimum in an area where the degree-of-non-correspondence distribution U(s) is less than or equal to the threshold value K (in the example in FIG. 4, s6 and s3) as the amount of adjustment of a disparity value. This can further increase or decrease the depth of the object being observed during stereoscopic vision.

Alternatively, the disparity value adjustment unit 13h may set the amount of shift s at which the degree-of-non-correspondence distribution U(s) is equal to the threshold value K (in the example in FIG. 4, s3, s4, s5, and s6) as the amount of adjustment of a disparity value. The amount of shift s is an amount corresponding to the limit allowed for the values of the degree-of-non-correspondence distribution U(s).

In the first and second embodiments described above, furthermore, the disparity value adjustment unit 13h detects the value of the amount of shift s at which the degree-of-non-correspondence distribution U(s) is minimum in an area where the degree-of-non-correspondence distribution U(s) is less than or equal to the certain threshold value K. However, the disparity value adjustment unit 13h may set the threshold value K to a value that varies in accordance with the amount of shift s. In this case, the following situation is taken into account: As the amount of shift s increases, feature points corresponding to feature points in the vicinity of an image end in the left-eye image are not included in the right-eye image, resulting in an increased possibility of the degree-of-non-correspondence distribution U(s) being increased.

For example, the disparity value adjustment unit 13h uses, instead of the threshold value K in the first or second embodiment described above, a threshold value K(s) calculated using Expression (19) as follows:

[Math. 19]

$$K(s) = \begin{cases} \alpha & (|s| > s_k) \\ \beta & (\text{otherwise}) \end{cases} \quad (19)$$

where $\alpha$ and $\beta$ are constants satisfying the relationship $\alpha > \beta$, and $s_K$ is a preset amount of shift.

The disparity value adjustment unit 13h may also change the threshold value K in accordance with the statistics of the degree-of-non-correspondence distribution U(s) and the numbers M and N of feature points registered in the left-eye image feature point list 13e and the right-eye image feature point list 13f or the numbers $M_p$ ($1 \leq p \leq w$) and $N_p$ ($1 \leq p \leq w$) of feature points registered in the left-eye image feature point lists $13e_1$ to $13e_w$ and the right-eye image feature point lists $13f_1$ to $13f_w$.

For example, the disparity value adjustment unit 13h may use, instead of the threshold value K in the first embodiment described above, a threshold value K(M, N) calculated using Expression (20) as follows:

[Math. 20]

$$K(M,N) = K_0 + K_1(M+N) \quad (20)$$

where $K_0$ and $K_1$ are certain constants.

In addition, the disparity value adjustment unit 13h may use, instead of the threshold value K in the second embodiment described above, threshold values $K(M_1, M_2, \ldots, M_w, N_1, N_2, \ldots, N_w)$ calculated using Expression (21) as follows:

[Math. 21]

$$K(M_1, M_2, \ldots, M_w, N_1, N_2, \ldots, N_w) = K_2 + \frac{K_3}{w}\left(\sum_{p=1}^{w} M_p + \sum_{p=1}^{w} N_p\right) \quad (21)$$

where $K_2$ and $K_3$ are certain constants. Expression (21) is formed by the replacement of M in Expression (20) by the average value of the numbers $M_p$ ($1 \le p \le w$) of feature points registered in the left-eye image feature point lists $13e_1$ to $13e_w$ and by the replacement of N in Expression (20) by the average value of the numbers $N_p$ ($1 \le p \le w$) of feature points registered in the right-eye image feature point lists $13f_1$ to $13f_w$.

In Expressions (20) and (21), as the number of feature points increases, the threshold value increases in order to address the problems in that the human visual characteristics are difficult to completely simulate through filter processing and an excessive increase in the number of feature points makes it difficult to associate feature points with each other.

In the first and second embodiments described above, furthermore, the disparity value adjustment unit $13h$ sets the amount of adjustment of a disparity value to the value h of the amount of shift s at which the degree-of-non-correspondence distribution U(s) is minimum. However, the angle of disparity within which the human eye could fuse images may be taken into account, and the amount of adjustment of a disparity value may be set to a value given by h+a, h−a, or the like using a constant a.

In addition, in a case where the image processing device 10 is to display a moving image, the disparity value adjustment unit $13h$ may smooth the amounts of adjustment of disparity values calculated for a plurality of consecutive input images in the time direction, and may use the resulting values as the amounts of adjustment of the disparity values. The reason for this is that a large increase in the change of the amount of adjustment of the disparity values with time makes it difficult to achieve stereoscopic vision.

In the first and second embodiments described above, furthermore, the image processing device 10 having the display unit 15 includes the left-eye image feature point extraction unit $13b$ or the left-eye image feature point extraction units $13b_1$ to $13b_w$, the right-eye image feature point extraction unit $13d$ or the right-eye image feature point extraction units $13d_1$ to $13d_w$, and the disparity value adjustment unit $13h$. However, these processing units may be included in a device separate from the image processing device 10 having the display unit 15. For example, these processing units may be included in a video output device (recording medium playback device) such as a DVD player or a Blu-ray Disc player.

Reference Signs List

10 ... image processing device; 11 ... input unit; 12 ... input image processing unit; 13 ... image adjustment unit; $13a$ ... left-eye image pre-processing unit; $13b$, $13b_1$ to $13b_w$ ... left-eye image feature point extraction unit; $13c$ ... right-eye image pre-processing unit; $13d$, $13d_1$ to $13d_w$ ... right-eye image feature point extraction unit; $13e$, $13e_1$ to $13e_w$ ... left-eye image feature point list; $13f$, $13f_1$ to $13f_w$ ... right-eye image feature point list; $13g$ ... number-of-non-corresponding-points calculation unit; $13h$ ... disparity value adjustment unit; 14 ... display control unit; 15 ... display unit; 16 ... glasses synchronization unit; 17 ... communication processing unit; $30a$, $31a$, $32a$ ... left-eye image; $30b$, $31b$, $32b$ ... right-eye image.

The invention claimed is:

1. An image processing device for adjusting a disparity value between a left-eye image and a right-eye image, the image processing device comprising:
    a feature point extraction unit that extracts feature points from each of the left-eye image and the right-eye image;
    a number-of-non-corresponding-points calculation unit that calculates, in a case where the feature points in one image among the left-eye image and the right-eye image, which are extracted by the feature point extraction unit, are shifted a certain distance in a horizontal direction, the number of feature points in the one image that do not correspond to the feature points in the other image, for each shift distance; and
    a disparity value adjustment unit that adjusts a disparity value between the left-eye image and the right-eye image in accordance with the number calculated for each shift distance by the number-of-non-corresponding-points calculation unit.

2. The image processing device according to claim 1, wherein the feature point extraction unit performs filtering on the left-eye image and the right-eye image using a filter having certain response characteristics, and extracts, as a feature point in the left-eye image and a feature point in the right-eye image, pixels having larger pixel values than a certain threshold value in a left-eye image and a right-eye image that are obtained as a result of the filtering.

3. The image processing device according to claim 2, wherein the feature point extraction unit executes filtering by applying a plurality of filters having different response characteristics to each of the left-eye image and the right-eye image, and extracts, as a feature point in the left-eye image and a feature point in the right-eye image, pixels having larger pixel values than a certain threshold value in a left-eye image and a right-eye image that are obtained as a result of respective filtering.

4. The image processing device according to claim 2, wherein the filter is a bandpass filter.

5. The image processing device according to claim 1, wherein the disparity value adjustment unit adjusts a disparity value between the left-eye image and the right-eye image in accordance with a frequency distribution where a frequency is represented by the number calculated by the number-of-non-corresponding-points calculation unit and a class is represented by a distance between a feature point in the left-eye image and a feature point in the right-eye image.

6. The image processing device according to claim 1, wherein the number-of-non-corresponding-points calculation unit calculates the number of feature points in the one image in such a manner that a feature point having a pixel value that is spaced away from a pixel value of a feature point in the other image by a certain value or more is included in the feature points in the one image that do not correspond to the feature points in the other image.

7. The image processing device according to claim 1, further comprising a display control unit that controls display processing of the left-eye image and the right-eye image between which a disparity value has been adjusted by the disparity value adjustment unit.

8. An image processing method for adjusting a disparity value between a left-eye image and a right-eye image, the image processing method comprising:
    a feature point extracting step of extracting feature points from each of the left-eye image and the right-eye image;
    a number-of-non-corresponding-points calculating step of calculating, in a case where the feature points in one image among the left-eye image and the right-eye image, which are extracted in the feature point extracting step, are shifted a certain distance in a horizontal direction, the number of feature points in the one image that do not correspond to the feature points in the other image, for each shift distance; and a disparity value adjusting step of adjusting a disparity value between the left-eye image and the right-eye image in accordance with the number calculated for each the shift distance in the number-of-non-corresponding-points calculating step.

9. A non-transitory computer-readable recording medium having recorded thereon the computer program for causing a computer to execute the image processing method according to claim 8.

\* \* \* \* \*